United States Patent [19]

Jacomini

[11] 4,275,396
[45] Jun. 23, 1981

[54] HELICOPTER ROTATING BLADE DETECTION SYSTEM

[76] Inventor: Omar J. Jacomini, Box 912, Severna Park, Md. 21146

[21] Appl. No.: 84,220

[22] Filed: Oct. 12, 1979

[51] Int. Cl.³ .............................................. G01S 13/02
[52] U.S. Cl. .............................. 343/5 SA; 343/5 HE; 343/17.1 PF
[58] Field of Search ........... 343/5 SA, 5 HE, 17.1 PF

[56] References Cited

U.S. PATENT DOCUMENTS

| | | | |
|---|---|---|---|
| 1,981,884 | 11/1934 | Taylor et al. | 343/5 SA X |
| 3,733,603 | 5/1973 | Johnston | 343/5 SA |
| 3,858,209 | 12/1974 | Zulch | 343/5 SA X |
| 3,983,558 | 9/1976 | Rittenbach | 343/5 SA X |
| 4,038,656 | 7/1977 | Webb, Jr. et al. | 343/5 HE X |
| 4,101,890 | 7/1978 | Goyard | 343/5 SA X |
| 4,106,019 | 8/1978 | Alexander et al. | 343/17.1 PF X |
| 4,143,373 | 3/1979 | Chernick | 343/17.1 PF |

*Primary Examiner*—T. H. Tubbesing

[57] ABSTRACT

An airborne pulse doppler radar set generally includes a moving target indicator (MTI) system for detecting moving aircraft within its scanning purview. To avoid processing undesirable clutter, the MTI system includes a clutter cancelling type filter for rejecting doppler shift frequency signals reflected from objects moving at velocities below a predetermined minimum velocity value. Unfortunately, the doppler shift frequencies representative of the body velocity of most helicopters fall within this clutter repetition band and may go undetected by the MTI system. To detect these helicopters, a helicopter detection system which operates on the specular flash energy of the doppler shift frequency signals reflected from the rotating blades of a helicopter is provided. The helicopter detection system passes substantially the received reflected radar signals that have doppler shift frequencies representative of the helicopter rotating blade velocities, derives a threshold value based on the values of the passed signals, and generates detection signals at times corresponding to the passed signal values which are at least that of the derived threshold value. In addition, the helicopter detection system is capable of inhibiting the generation of the detection signals at time corresponding to the reception of interference type radar signals by the radar set. Furthermore, an unambiguous range of each detected helicopter may be computed. Moreover, the helicopter detection system has the capability of distinguishing between detected targets having even and odd numbers rotating blades.

23 Claims, 12 Drawing Figures

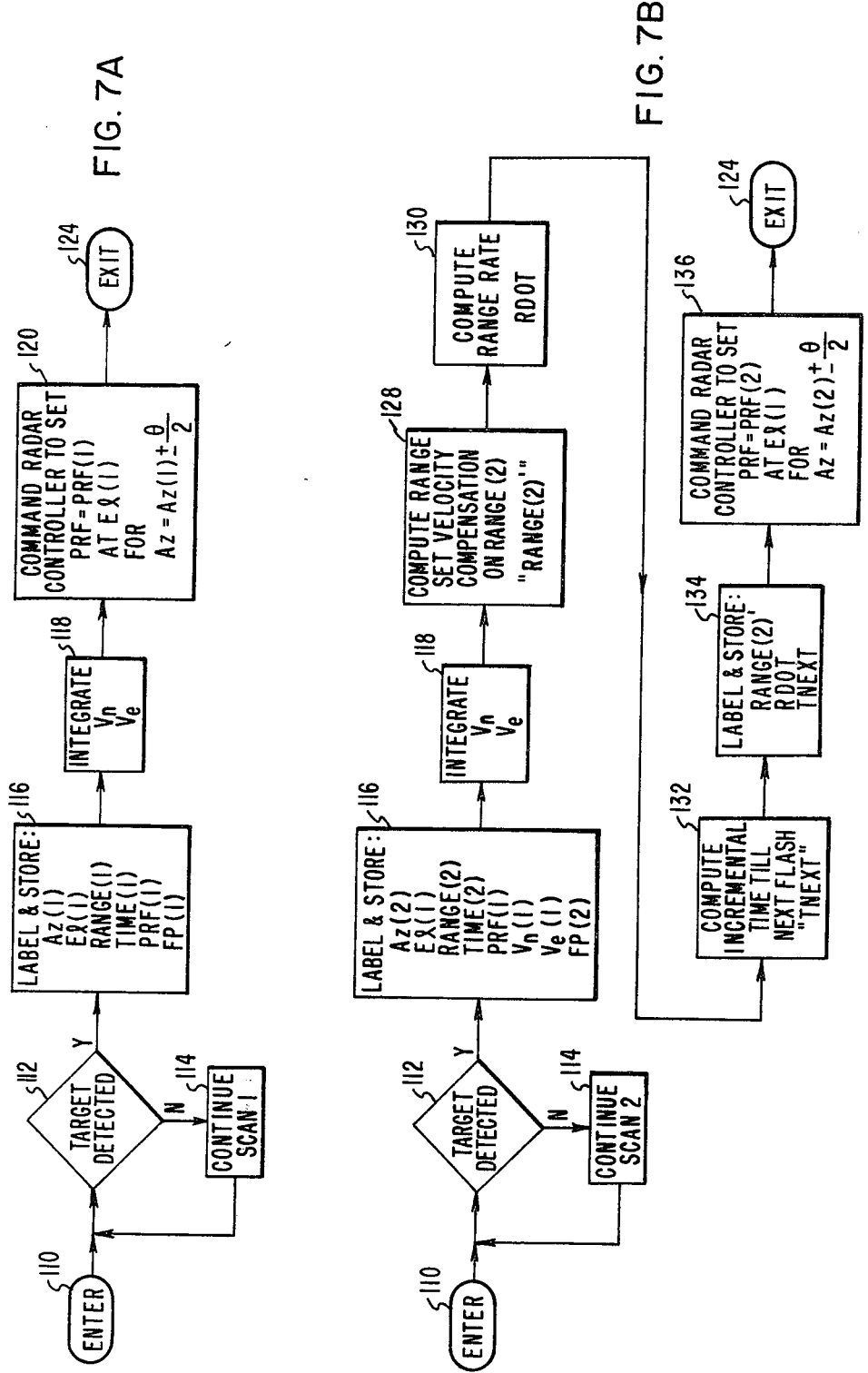

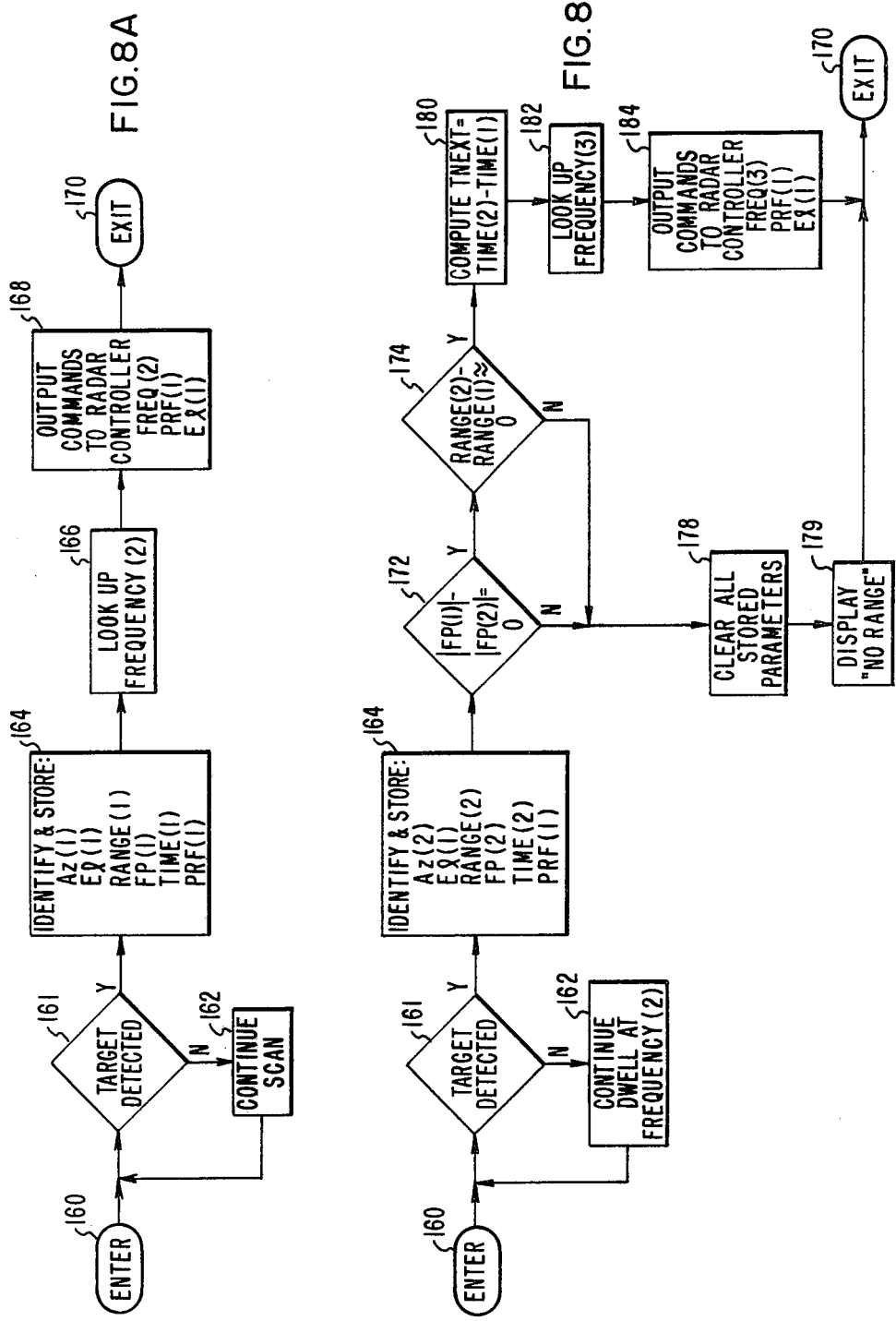

HELICOPTER ROTATING BLADE DETECTION SYSTEM

BACKGROUND OF THE INVENTION

The present invention relates broadly to the detection of helicopters, and more particularly to a pulse doppler radar system which detects and identifies an operational helicopter and derives the unambiguous range thereof utilizing the specular flash energy of the doppler shift frequency signals reflected from the rotating blades of the helicopter.

Airborne surveillance pulse doppler radars, in some cases, provide advance warning of enemy and unidentified aircraft flying within their scanning purview. It is well known that certain types of helicopters may be equipped with offensive weaponry to become a viable military threat. To the military, then, the detection, identification and tracking of helicopter targets by the advanced warning airborne radars are of paramount importance. Allowing helicopter targets to avoid detection of the airbore radars may result in the unbalancing of military position.

Most airborne pulse doppler radars include signal filtering circuitry to cancel or reject doppler shift frequency signals derived from the reflections of stationary and slow moving objects, generally known as radar clutter. The minimum detectable target velocity of these clutter cancelers is usually adjusted to include doppler shift frequency signals of slow moving surface vehicles, like automobiles, for example. Unfortunately, the velocity range of most hovering and slow moving helicopter targets falls below this minimum detectable target velocity. Consequently, their doppler shift frequency signals are also canceled in the airborne radars, permitting these helicopter targets to go undetected. Now, it is always possible to reduce the minimum detectable target velocity of airborne radars to detect the helicopter targets; however, this will also result in the additional detection of the moving surface vehicles. Since there exists, in general, a significantly larger number of moving surface vehicles than helicopter targets, the probability of distinguishing between the doppler shift frequency signals of a target helicopter and the moving surface vehicles with present airborne radars is extremely low. In fact, the detection of a helipcopter target under these conditions may be considered virtually impossible. Therefore, it becomes readily apparent that another approach must be considered for detecting these helicopter targets, something beyond that of utilizing the velocity of the moving craft itself.

In another aspect of aircraft target detection, most pulse doppler airborne radar sets function with medium to high pulse repetition frequency (PRF) transmissions, on the order of 25 KHz, for example. As a result, the range indication of a detected target aircraft is ambiguous in that there are a plurality of range cells at which the detected target will satisfy the timing of the received signal return of a particular PRF of the airborne radar. To resolve the ambiguities in range, some airborne radars transmit radar signals at a plurality of PRF's and correlate the received signals from the detected target. In the correlation process, only the unambiguous range of the detected target will remain fixed while the ambiguous ranges will vary in proportion to the particular PRF being transmitted. If helicopters are also included as potential moving aircraft targets of the airborne radar, considerations must also be given to resolving the ambiguities in the range thereof. Since the detection of helicopters may involve a characteristic of the craft other than its body or skin velocity, a simple variation in PRF to resolve ambiguities in the range of the detected helicopter may not be sufficient.

Still another aspect of aircraft target detection is the ability of most airborne radars to discriminate between detected moving targets within their radar scanning purview. Generally, it is not until one detected target aircraft is distinguished from another can the ambiguous range thereof be unambiguously resolved. Known airborne pulse doppler radar sets employ a plurality of doppler shift frequency filter banks to distinguish between a variety of moving target aircraft. In these systems, it is basically assumed that each moving target aircraft has a unique velocity vector (i.e. speed and direction) which separates it from the others. Thus, each detected target aircraft is resolved uniquely into corresponding doppler frequency bands or cells. And thereafter, each identified target may be processed individually from its correspondingly associated doppler frequency band. Since it is likewise possible to have more than one moving helicopter target within the scan of the pulse doppler radar set, it may be additionally necessary, in any helicopter detection system, to distinguish between multiple helicopter targets in some cases. However, pulse doppler radar detection of helicopters may involve characteristics endemic to only helicopters which may yield doppler shift frequencies which are inapplicable to the known teachings of partitioning aircraft targets into doppler frequency bands corresponding to their velocity vectors. Here again, for helicopter detection with pulse doppler radars, another way of distinguishing one craft from another may be required under certain situations or for all cases.

Representative of pulse doppler radar sets is the disclosed subject matter found in the following U.S. Patents all assigned to the same assignee as of the present application:

(1) U.S. Pat. No. 4,079,376 entitled "Target Detection System in a Medium PRF Pulse Doppler Search/Track Radar Receiver"; issued to John C. Kirk; filed on Mar. 9, 1976 and issued Mar. 14, 1978;

(2) U.S. Pat. No. 4,093,948 entitled "Target Detection in a Medium PRF Pulse Doppler Radar"; issued to H. Long III; filed on June 8, 1976 and issued on June 6, 1978;

(3) U.S. Pat. No. 4,095,222 entitled "Post Detection STC in a Medium PRF Pulse Doppler Radar"; issued to David H. Mooney, Jr.; filed on May 27, 1976 and issued on June 13, 1978; and (4) U.S. Pat. No. 4,137,532 entitled "VIP Doppler Filter Bank Processorfor Pulse Doppler Radar"; issued to John W. Taylor, Jr. et al.; Filed on Apr. 29, 1977 and issued June 30, 1979.

All the patents set forth above are provided as a reference herein for a more detailed description of known pulse doppler radar sets.

Moreover, in a helicopter detection radar system, just like in any other radar aircraft detection system, the ability to distinguish real reflection signals of target helicopters from false pulse interference signals from enemy jammers or even friendly radar, for example, should be included. Without protection against pulse interference, the detection system may be rendered ineffective and caused to respond to false detection of helicopter targets. Thus, the viability of such a detection system would be deemed inadequate for the purposes for which it was designated. Therefore, in any helicopter detection radar system consideration must be additionally given to the handling of strong, high amplitude, impulse radar interference.

SUMMARY OF THE INVENTION

An airborne radar set comprises a transmitting unit for transmitting radar energy pulses within a scanning purview, a receiving unit for receiving transmitted radar signals which are reflected from objects within the radar scanning purview and which include the doppler shift frequency signals thereof, and a first processor for processing the doppler shift frequency signals to detect moving aircraft in the radar scanning purview. The first processor includes a first filtering means for rejecting substantially doppler shift frequency signals which fall within predetermined frequency bands to avoid the processing thereof. Aircraft which have body velocities that render reflected doppler shift frequency signals within the predetermined frequency bands may not be detected by the first processor. Most helicopters fall in this class of aircraft. In accordance with the present invention, the airborne radar set further includes a second processor for detecting helicopters, which may go undetected by the first processor, by operating on the specular flash energy of the doppler shift frequency signals reflected from the rotating blades thereof.

More specifically, the second processor includes a second filtering means which is operative to pass substantially from the receiving unit that portion of the received reflected radar signals that has doppler shift frequencies representative of the velocity of at least one rotating blade of at least one helicopter, a means for deriving a threshold value based on the signal values passed by the second filtering means, and a means for generating detection signals, representative of the presence of at least one helicopter in the scanning purview of the radar set, corresponding to the signals passed by the second filtering means which have values of at least that of the derived threshold value.

Moreover, since most airborne radar sets are additionally operative to receive interference radar signals which are, at times, capable of causing the second processor to falsely detect the presence of a helicopter, the second processor includes another processing means which is operative to detect the doppler shift frequency signals of the received interference radar signals and to inhibit the generation of the detection signals of the second processor at times corresponding to the detected radar interference signals.

Still further, the second processor includes a means which is operative to compute the unambiguous range of each detected helicopter in the scanning purview of the radar set.

Even further, the second processor additionally includes a means for distinguishing between a detected helicopter having an even number of rotating blades and a detected helicopter having an odd number of rotating blades.

BRIEF DESCRIPTION OF THE DRAWINGS

FIGS. 7A, 7B and 7C are functional flowcharts for use in describing one mode of operation of the unambiguous range computer of the embodiment of FIG. 2; and FIGS. 8A, 8B and 8C are functional flowcharts for use in describing an alternative mode of operation of the unambiguous range computer of the embodiment of FIG. 2.

DESCRIPTION OF THE PREFERRED EMBODIMENT

Figure 1:
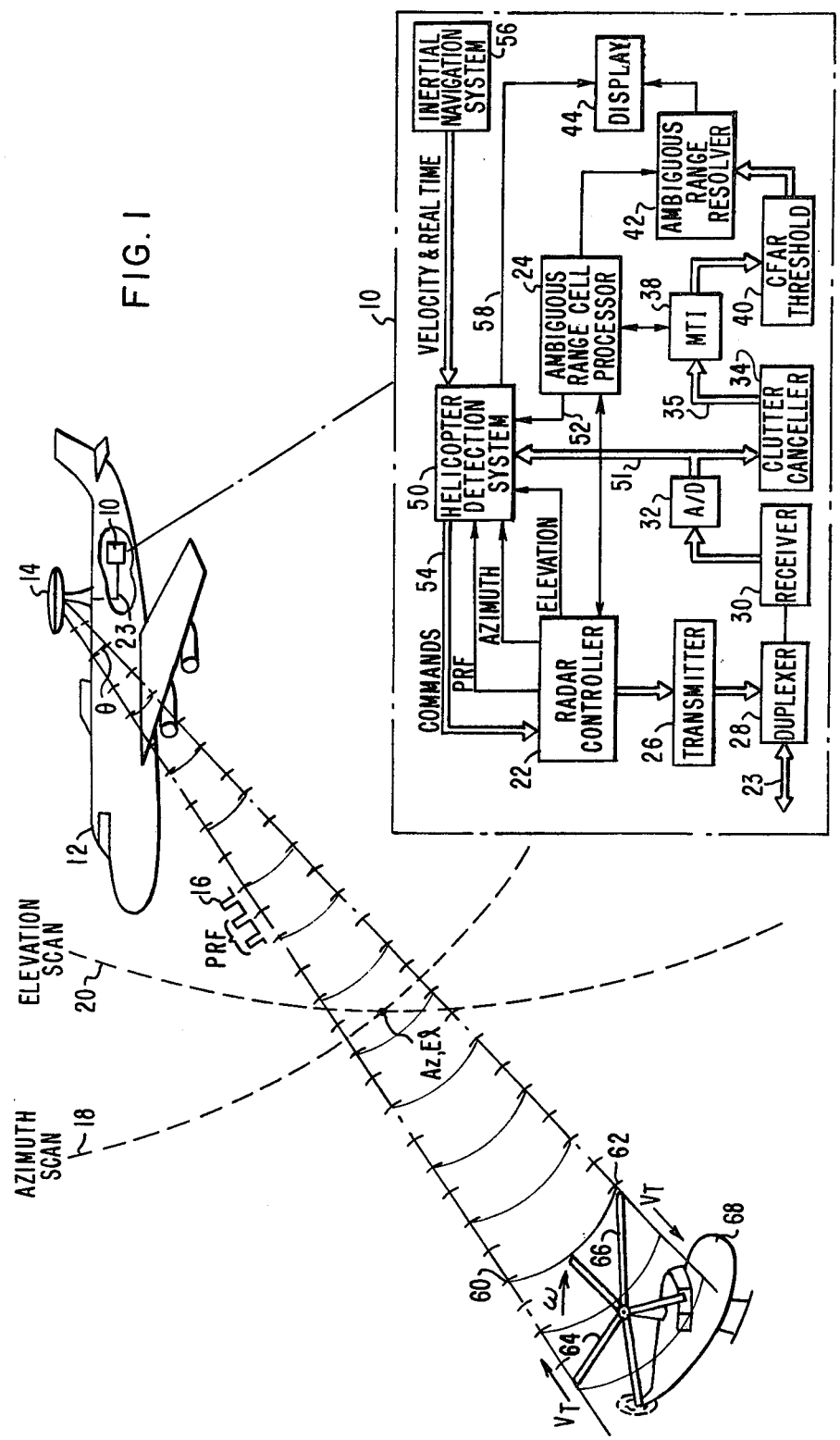
FIG. 1 illustrates an airborne radar set environment suitable for embodying the present invention.

Fig. 1 depicts illustratively an environment suitable for the embodiment of the present invention. A pulse doppler type radar set 10 may be disposed on-board an aircraft 12. An antenna 14 additionally mounted on-board the aircraft 12 may be governed by the radar set 10 to transmit pulsed radar energy at at least one pulse repetition frequency (PRF) 16 with a beam width of $\theta$ in a scanning purview about the aircraft 12 generally characterized by azimuth and elevation coordinates (Az, El). Typically, the radar transmission beam may be scanned in the azimuth direction 18 with a 360° arc and in the elevation direction 20 at a plurality of elevation levels.

In FIG. 1, the radar set 10 has been depicted in more detail as a functional block diagram schematic. Usually, a radar controller 22 conventionally computes the beam pointing paths of the radar transmissions and governs the elements of the antenna 14 accordingly over signal lines 23. In addition, the radar controller 22 may further compute the PRF of the radar transmission in conjunction with a conventional ambiguous range cell processor 24 and govern the transmitter 26 through a duplexer 28 and signal lines 23 to cause pulsed transmissions at the computed PRF values. Reflections from an object in the transmission beam of the antenna 14 are received thereby and passed through signal lines 23 and the duplexer 28 into a conventional radar receiver 30. The receiver 30 generally conditions the received signals to convenient frequency levels and often divides the received signals into their In-phase and Quadrature components. Included in the reflected received signals are the pulse doppler shift frequency information corresponding to the movement of the particular object from which they are reflected from.

Most modern pulse doppler radar sets generally process their data digitally and therefore require an analog-to-digital converter 32 for these purposes. For this reason, then, the conditioned signals passing through the receiver 30 may be provided to the A/D converter 32 prior to further processing. Downstream of the A/D converter 32 is a conventional clutter canceler 34 which is essentially a multipole filter for rejecting doppler shift frequencies normally associated with radar clutter objects such as rain, chaff and even moving surface vehicles, like automobiles, for example. The signals 35 passed through the clutter canceler 34 generally comprise doppler shift frequencies representative of moving object velocities above a minimum detectable target velocity. The signals 35 may be coupled to a conventional moving target indicator (MTI) 38 which functions typically in conjunction with the ambiguous range cell processor 24 and a CFAR threshold generator 40 to provide a set of ambiguous ranges for each detectable moving object above the minimum detectable velocity set by the clutter canceler 34.

These sets of ambiguous ranges are commonly classified into range cells associated with the particular PRF transmitted and received by the radar set 10. For each detectable moving object in the scanning purview of the radar set 10, an unambiguous range is derived from the various sets of ambiguous ranges associated therewith. This function is performed normally in an ambiguous range resolver such as shown at 42. The unambiguous range in addition to other parameters for each detectable moving object may be displayed to an operator through an interactive display device 44 more commonly referred to as a PPI.

It is understood that the aforementioned constituent functional parts of the radar set 10 are generally well known to those skilled in the pertinent art. For a more detailed description of the operation of these functional blocks reference is hereby made to the references 1 through 4 provided hereinabove in the Background section of the instant application. Since the operation of these combined functions are so generally well known just a brief description of their combined operation will be entertained at this point.

Typically, in operation, the radar controller 22 governs the antenna elements at 14 over the signal lines 23 to either mechanically and/or electronically scan the air space through a plurality of azimuth and elevation levels. Usually, one scan comprises a plurality of azimuthal beam scans of 360° corresponding to a plurality of elevation levels at various points in the scan. Within the radar scanning purview, the PRF of the radar transmitter 26 may be varied in accordance with either distinguishing one moving target from another or for computing the unambiguous range of a target or a combination of both. During the receive time of the radar set 10, the duplexer 28 passes reflected radar signals and radar signals which may come from other possibly interfering type transmitters to the receiver section 30. The receiver section 30 normally beats the RF frequencies down to IF and divides the received signals into their I and Q components. The composite signals are then provided to the A/D converter 32 in which they are continuously digitized at some prespecified sampling rate. Next, the clutter canceler 34 rejects the doppler shift frequency signals representative of stationary and moving objects below a minimum detectable velocity. The MTI circuit 38 along with the CFAR threshold circuit 40 generally detect the presence of a moving target. In some systems, in which the PRF is high around 25 KHz, for example, a set of ambiguous range values are determined for each moving target. In these cases, an ambiguous range cell processor 24 normally functions with the radar controller 22 to vary the transmitted PRF of the radar signal. With each new PRF value, another set of ambiguous range values is derived by the MTI 38 and CFAR threshold 40. The ambiguous range resolver 42 functions to determine a reasonably unique unambiguous range from the sets of ambiguous range values associated with the same target. While the above description is oversimplified in nature, it is believed adequate to provide an understanding of the basic operation of an airborne pulse doppler radar set and its relevancy to the present invention which will be better understood from the description here to follow.

Still referring to FIG. 1, in accordance with the present invention, a helicopter detection system 50 may be disposed within the radar set 10 as illustratively denoted in the functional block schematic. Digitized received signals from A/D converter 32 may be additionally provided to the helicopter detection system 50. Also, information related to the PRF being tramsitted by the radar set 10 and corresponding azimuth and elevation coordinate readings may all be supplied to the helicopter detection system 50 from the radar controller 22, for example. Still futher, the ambiguous range cell processor 24 may provide signals 52 sufficient in information to permit the helicopter detection system 50 to determine a set of ambiguous range values associated with the detection of a target helicopter. Just as the ambiguous range cell processor 24 coordinates its functions with the radar controller 22 to assist in the derivation of the unambiguous range of a moving target, the helicopter detection system 50 also provides commands over signal lines 54 which are used in the derivation of an unambiguous range associated with the detection of a helicopter target. For a further refinement in the derivation of the unambiguous range of a helicopter target, additional signals related to the velocity of the aircraft and the real time are provided to the helicopter detection system 50 from a conventional inertial navigation system 56 of the aircraft 12. And accordingly, the unambiguous range and other possible prespecified parameters of each detected helicopter within the scanning purview of the radar set 10 may be provided to the display unit 44 over signal lines 58.

It has been explained in the background section of the instant application that the problem with detecting helicopter craft by an airborne radar such as 10 is that the reflected doppler shift frequenciesfrom hovering and/or slow moving helicopters within the scanning purview of the radar set are generally confused with surface moving vehicles such as automobiles, for example. Generally, the clutter canceler 34 is adjusted such that its minimum detectable target velocity includes the doppler shift frequencies from the moving surface vehicles. With this the case, the hovering and/or slow moving helicopters having doppler shift frequency reflections in these same frequency ranges may also be rejected from being further processed. Therefore, these type helicopter targets may go undetected from the airborne radar set 10.

To solve this problem, the present embodiment provides for the helicopter detection system 50 to function in parallel with the MTI 38 of the radar set 10 for specifically detecting helicopter type targets using unique characteristics of their rotating blade velocities. The reflected signals like that shown at 60 and 62 from the rotating blades 64 and 66, respectively, of a helicopter 68 contain doppler shift frequency information with respect to the velocity of the rotating blades 64 and 66. This received signal portion may be passed through the duplexer 28, reveiver 30, possibly digitized by the A/D converter 32, and provided to the helicopter detection system 50 over signal lines 51. The helicopter detection system 50 may distinguish substantially the doppler shift frequency signals associated with only the rotational velocity $V_T$ of the rotating blades of the helicopter 68.

Furthermore, the helicopter detection system 50 may utilize the condition that as either rotating blade 64 or 66, for example, rotates, it will pass through a position such that its surface will be perpendicular to the line of sight radar transmission designated by the radar beam $\theta$. When this occurs, a specular flash signal of a much larger amplitude will be reflected to the radar set 10. For one typical example of a five-bladed helicopter, this specular flash reflection cross-section has a peak radar echo of 36 square meters which endures for a period of about 0.32 milliseconds and appears approximately once every 30 milliseconds.

Thus, the helicopter detection system may appropriately average the partitioned doppler shift frequency signals or some characteristic thereof and indicate the presence of a helicopter target with the identification of the specular flash from the rotating blade or blades associated therewith. With the ability to detect this specular flash of energy from the partitioned or segregated doppler shift frequencies in the helicopter detection system 50, a helicopter may be identified.

Normally, a conventional MTI of a pulse doppler radar, which has a set of ambiguous ranges associated with the detection of a moving target, resolves the range ambiguity by assuming that the moving target has a unique velocity (i.e. speed and direction); therefore, by varying the PRF of the radar, the received signal information may be partitioned into a plurality of doppler frequency bands or cells, thereby separating the targets. See for example the references 1 through 4 in the Background section hereabove. However, since the helicopters may be detected through the specular flash energy representative of the velocity of the rotating blades thereof, and since these blade rotations generally cover a broad band of doppler shift frequencies which are generally representative of the same velocity values, the same principles of range resolution may not be applied, in all cases, in the helicopter detection system 50.

When a helicopter is detected, however, the set of ambiguous ranges may be derived by the helicopter detection system 50 from the information over signal lines 52 provided thereto by the ambiguous range cell processor 24. In addition, the PRF and azimuth and elevation coordinates (AZ,EL) of the scan in which the helicopter target is detected may be identified from the signals provided to the helicopter detection system 50 from the radar controller 22. Because of the interactivity between the helicopter detection system 50 and radar controller 22 the helicopter detection system 50 may be able to determine from subsequent radar scans when to expect the same target specular flash to appear. Knowing the approximate time in a subsequent scan at which a same helicopter target is expected to reflect a specular flash from its rotating blade or blades, the PRF of the radar set 10 may be adjusted to a second PRF value as governed by the system 50 whereby a second set of ambiguous range values associated with the same helicopter target may be derived in a like manner. With the two sets of ambiguous range values and first and second PRF values correspondingly associated therewith, an unambiguous range may be computed using any one of a number of well-known methods such as the "Chinese Remainder Theorem", for example.

For a further refinement, the sets of ambiguous range values may be compensated for positional changes of the aircraft 12 and the rate of change of the helicopter 68 which may both be determined by the helicopter detection system 50 and which will be described in greater detail in the following paragraphs.

Figure 2:
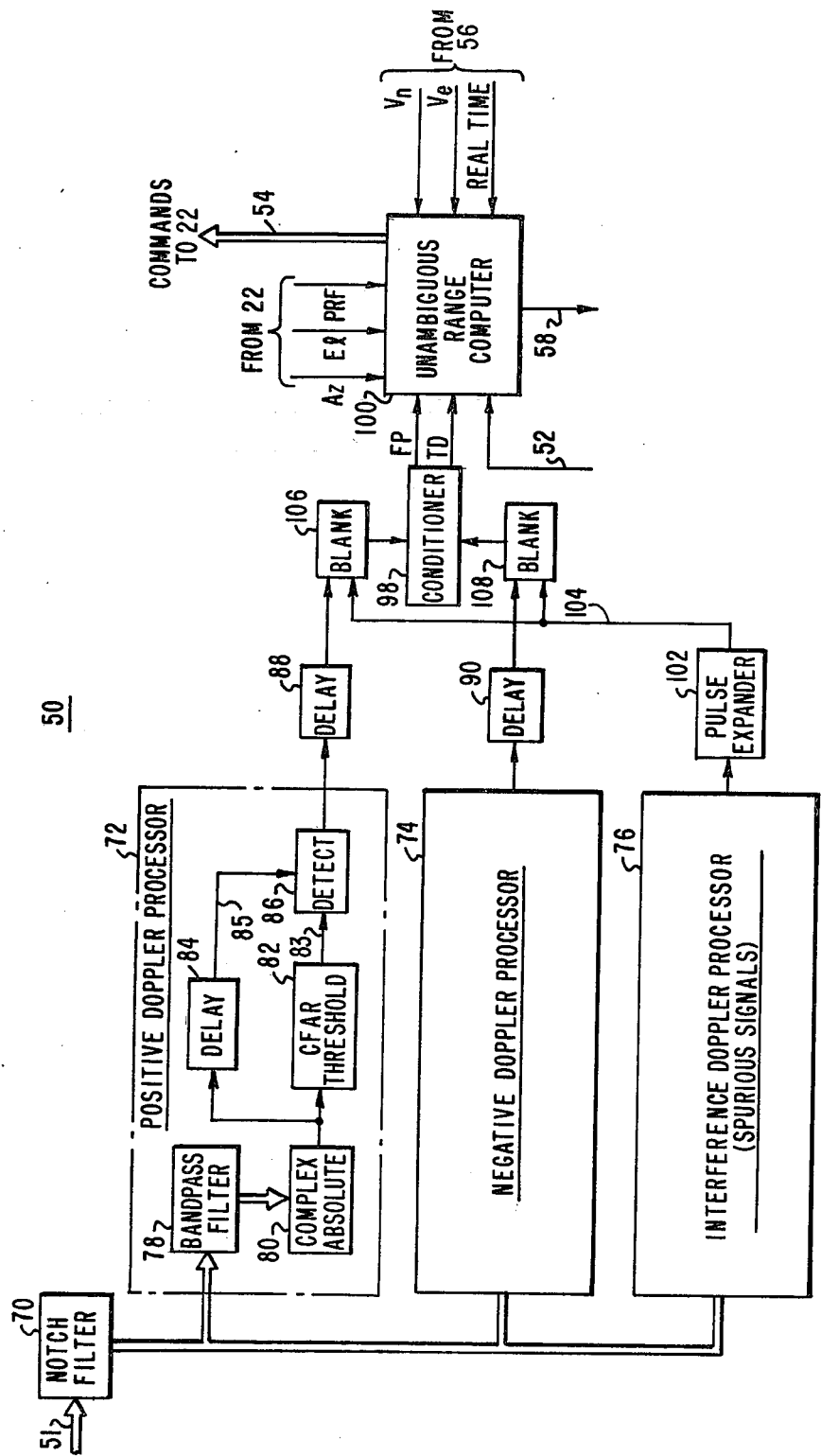
FIG. 2 is a block diagram schematic of an embodiment for a helicopter detection system suitable for use in the airborne radar set of FIG. 1.

A functional block diagram schematic of the helicopter detection system 50 is shown in greater detail in FIG. 2. For the purposes of the present embodiment, the signals 51 from the A/D converter 32 may be provided first to a notch filter 70 which, similar to the clutter canceller 34, may reject the doppler shift frequencies associated with objects moving below a minimum detectable velocity level. It may be possible, in some cases, to use the clutter canceller 34 for both the MTI system 38 and the helicopter detection system 34, thereby eliminating the need for the notch filter 70. For the cases in which the notch filter 70 is used, its output may be provided to three processors functioning in parallel—a positive doppler processor 72, a negative doppler processor 74 and an interference doppler processor 76. All three doppler processors 72, 74 and 76 may be constructed similar to the block diagram schematic shown within the dotted lines of the processor 72.

Figure 3:
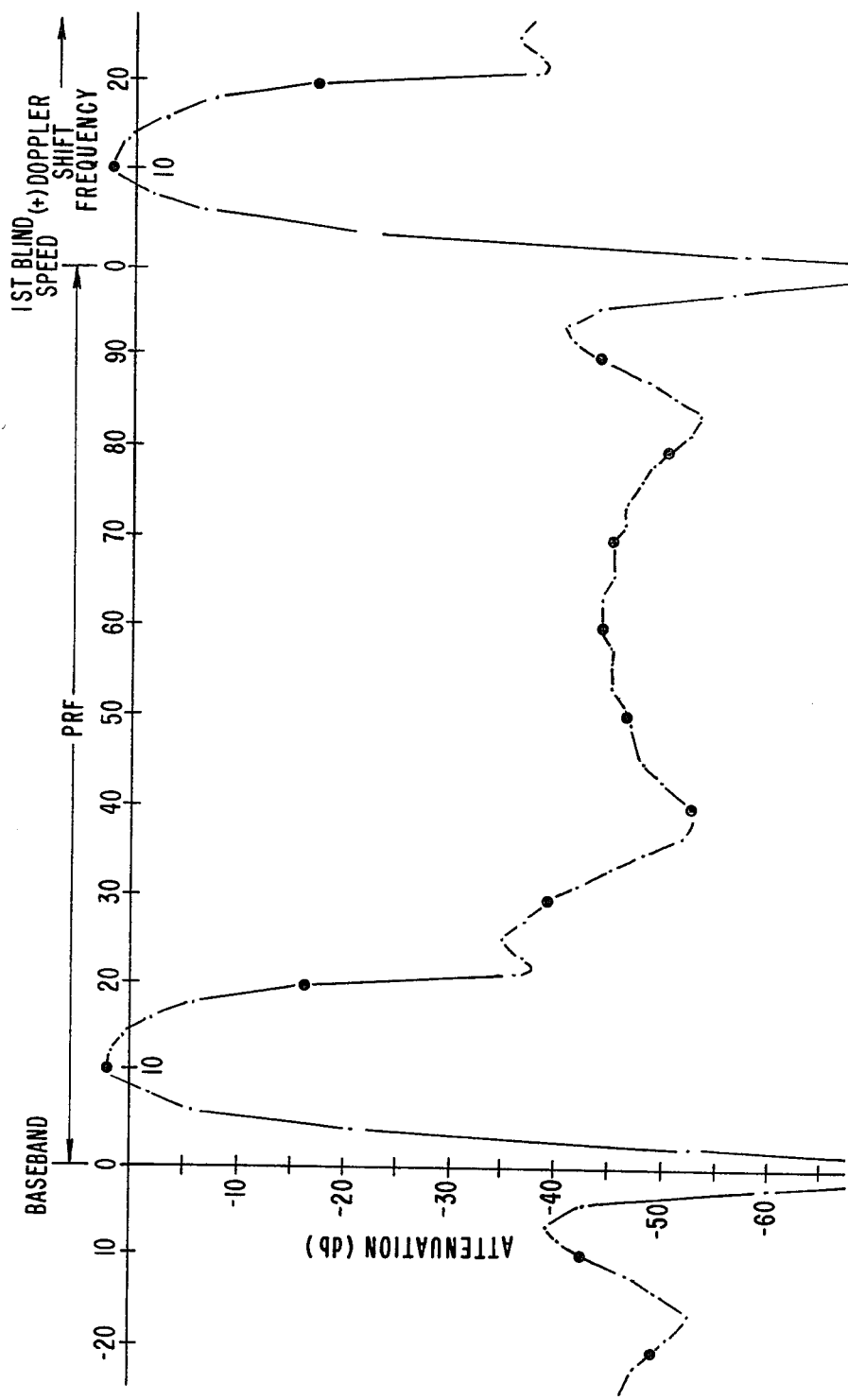
FIG. 3 is a graph depicting the combined characteristics of a notch filter and a bandpass filter suitable for use in connection with the positive doppler processor of FIG. 2.

More particularly, the doppler shift frequency signals passed by the notch filter 70 may be provided to a band-pass filter 78 which may be configured as a four-pole feedback filter, for example. The transfer function of the combination of filters 70 and 78 may be characterized similar to that shown in the graph of FIG. 3. Note that in the filter characterization, the positive doppler shift frequency signals around base-band, the first blind speed and harmonics thereof corresponding to the PRF transmitted by the radar are significantly attenuated. The design is such that positive doppler shift frequency signals of moving objects in the scanning purview of the radar set at velocities below the minimum detectable velocity will be substantially rejected as a result of these notches. Note further, that the filter characteristics of FIG. 3 provide for bands of positive doppler shift frequencies which are passed unattenuated. Positive doppler shift frequency signals outside the pass-band are significantly attenuated (rejected) at gains of $-35$ dB's or greater, for example. The doppler shift frequencies within the pass-band of the filter 78 are representative of the radar energy reflections from a blade of a helicopter rotating in a first direction. This first direction generally has a radial vector positively pointing toward the radar set 10 or radar transmissions thereof.

In the positive doppler processor 72, the positive doppler shift frequency signals being passed by the filter 78 may be next supplied to a complex absolute circuit 80 which is operative to compute the amplitudes thereof. Thereafter, the computed amplitudes may be provided to a constant false alarm rate (CFAR) threshold determination circuit 82 which for the purposes of the present embodiment may be a low-pass filter which performs an averaging function essentially for the computation of a CFAR threshold signal 83. The amplitude signals from 80 are delayed by a delay circuit 84 prior to being provided to the input of a detect circuit 86. In this embodiment, the delay of 84 may be adjusted in relation to the delay of the low-pass filter of 82 so that the delayed amplitude signal 85 and the computed CFAR threshold signal 83 may be provided to the detect circuit 86 in some predetermined relationship. In the detect circuit 86, the computed CFAR threshold 83 may be compared to the amplitude levels 85 from the delay circuit 84. When the amplitude levels 85 are at least equal to the computed threshold level 83, the amplitude signals may be gated through the detect circuit 86 to another delay circuit 88. It is understood that all of the elements of the positive doppler processor just described may be individually implemented with well-known circuit arrangements none of the details of which are considered part of the present invention.

Figure 4:
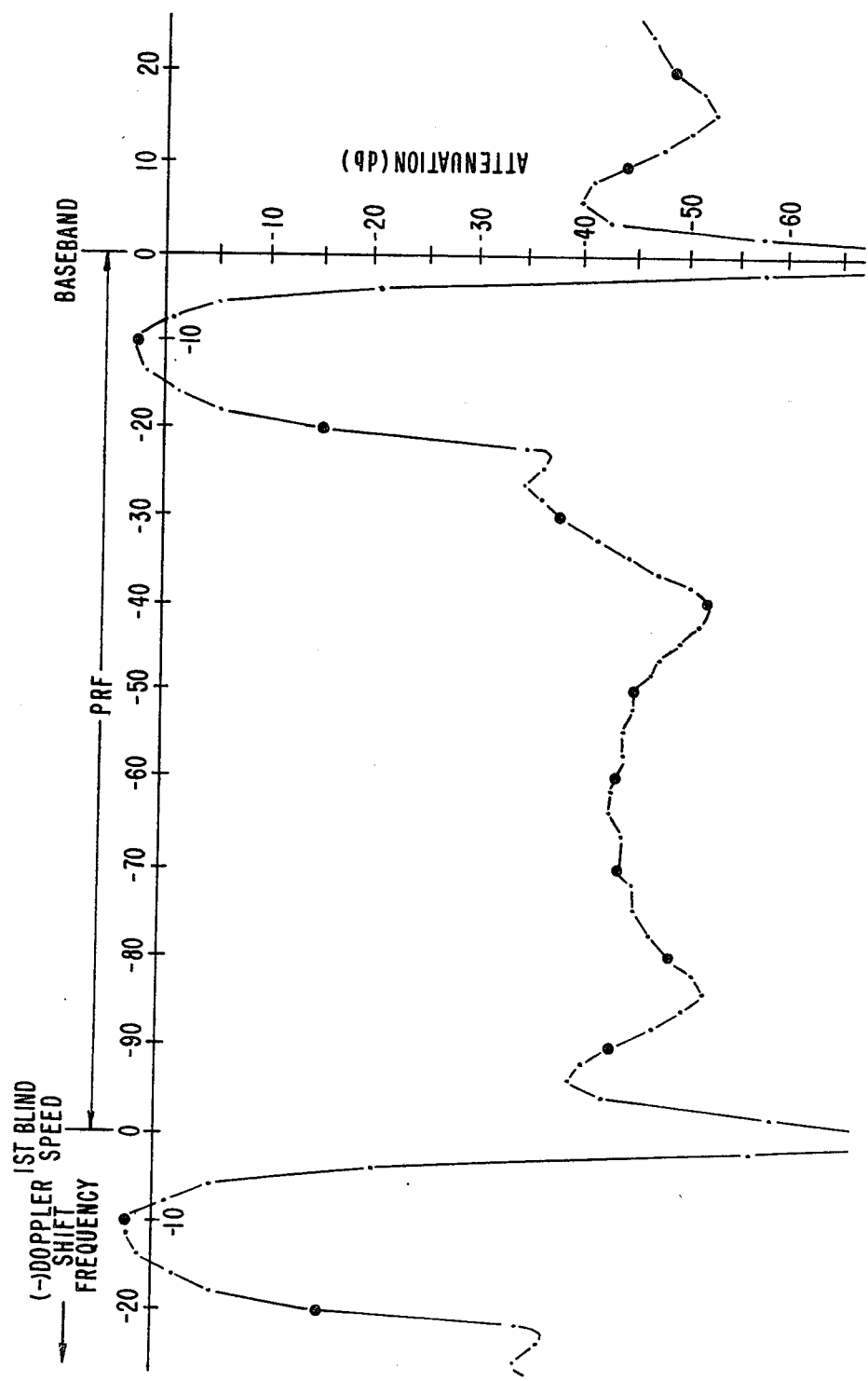
FIG. 4 is a graph depicting the combined characteristics of a notch filter and a bandpass filter suitable for use in connection with the negative doppler processor of FIG. 2.

Accordingly, the negative doppler processor 74 is also comprised of a similar arrangement of elements of a band-pass filter, complex absolute circuit, CFAR threshold circuit, a delay line and a detect circuit such as that described in connection with the positive doppler processor. However, the band-pass filter of the negative doppler processor 74 may be designed to effect the filter characteristics such as that shown in FIG. 4. Note that the difference being that the band-pass filter of the processor 74 passes only doppler shift frequency signals which are negative with respect to the base-band pulse repetition frequency (PRF) and all negative harmonics (blind speeds) thereof. The doppler shift frequencies which are passed thereby may be representative of reflective radar energy from a blade of a helicopter which is rotating in a second direction with respect to the radar set. This second direction generally has a radial vector positively pointing away from the radar set 10 or radar transmissions thereof.

To better understand the functions of the processors 72 and 74 in distinguishing between helicopter blade movement in a first and second direction, respectively, a descriptive example of a typical helicopter will be provided in connection with the illustration of FIG. 1. More specifically, a helicopter 68 is depicted in FIG. 1 as having five rotating blades, two of which are denoted as 64 and 66. The blades are rotated at an angular velocity $\omega$ which render a band of tangential velocities $V_T$ along the length of the blade. In this example, with the angular velocity $\omega$ depicted as shown, the blade 64 has a band of tangential velocities with radial vector components which are positive in the direction toward the radar set 10 (note that the radar set 10 and antenna 14 are considered as one unit and a point source with respect to the helicopter target 68). And likewise, the blade 66 is rotating such that it has tangential velocities which have radial component positively pointing away from the radar set 10. Therefore, the doppler shift frequencies of the reflected radar energy 60 are representative of the tangential velocities of the rotating blade 64 may be passed substantially by the positive doppler signal processor 72. And similarly, the doppler shift frequencies of the reflected radar energy 62 which are representative of the tangential velocities of the rotating blade 66 may be passed by the negative doppler processor 74.

It is understood that this brief description of operation is merely one example of the operation of the helicopter detection system 50 and should not be construed as the only possible operation thereof. Because of the complex and sophisticated processing of the receiver 30 of the radar set 10, directions other than radial may be distinguishable from the doppler shift frequencies of the rotating helicopter blades. Also, there may be possible cases in which the sign of the first and second rotational directions may be reversed in which case the velocities of the blade 64 may be passed by the positive doppler processor 74 and conversely the velocities of the blade 66 may be passed by the doppler processor 72.

In each of the processors 72 and 74, the amplitude signals passing through the delay circuits 84 which are at least the amplitude level of the computed CFAR threshold signal 83 are primarily representative of the high amplitude pulsed specular energy from a rotating blade which is approximately perpendicular to the radial direction of the radar set 10 or radial transmissions thereof. This is exemplified in the graphs of FIGS. 5 and 6.

For example, it has been estimated that for a five-bladed helicopter this peak spectral reflective energy condition will endure for about 0.32 milliseconds and appear approximately once every 30 milliseconds. With a PRF set at about 25 KHz, this endurance time is representative of about 6 to 8 energy pulse transmissions. It is understood by all those skilled in the pertinent art that a conventional CFAR circuit is operative to set a threshold for a particular range cell which is adjusted in level by the energy received in adjacent range cells. This may also be done in the present embodiment. Additionally, however, the computed threshold for any one range cell may be adjusted for a particular period of 0.32 milliseconds based on the energy received in the same range cell from adjacent periods of time. This feature may be incorporated so that the 6 to 8 pulse width specular burst from the helicoper blade may be distinguished from the much longer burst of pulses coming from either other aircraft targets or possible clutter breakthrough.

Figure 5:
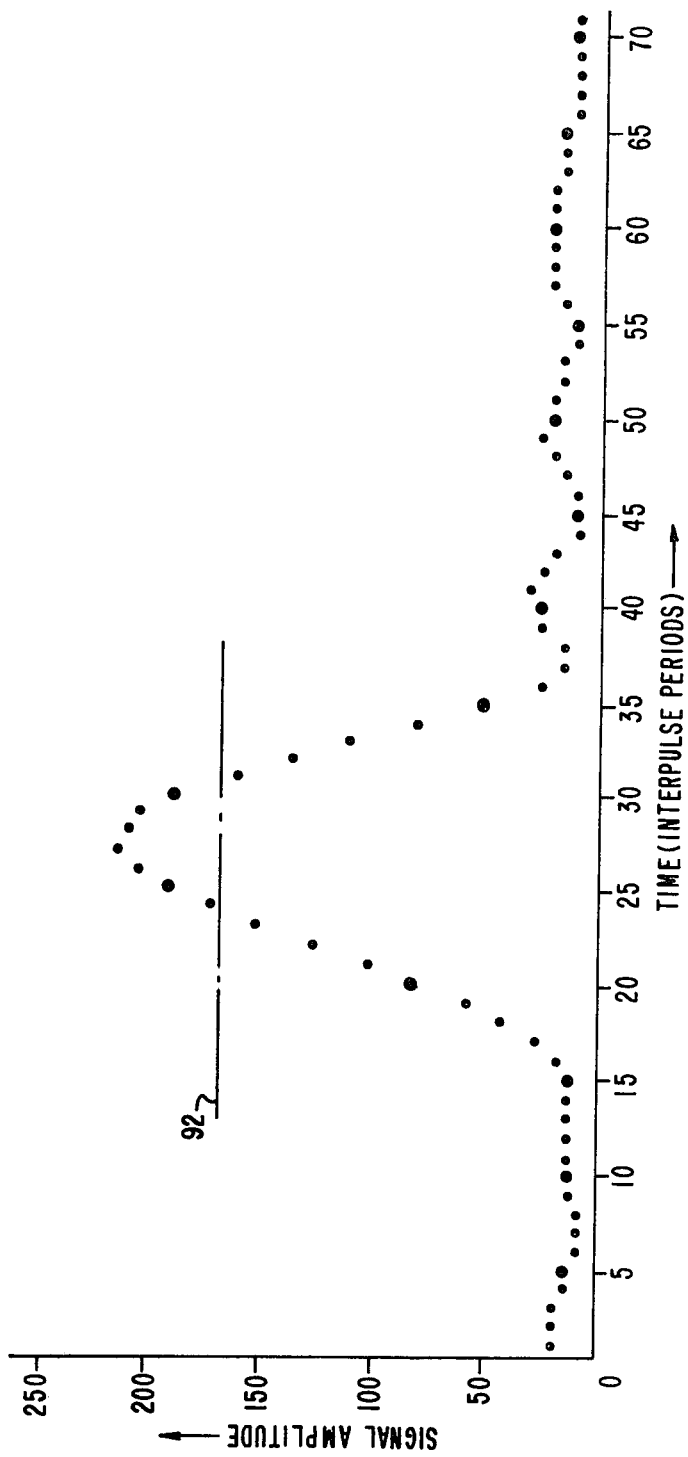
FIGS. 5 and 6 are graphs which illustratively depict a train of amplitudes that are representative of radar energy reflected from the rotating blades of a helicopter and that are derived by the negative and positive doppler processors of the embodiment of FIG. 2.
Figure 6:
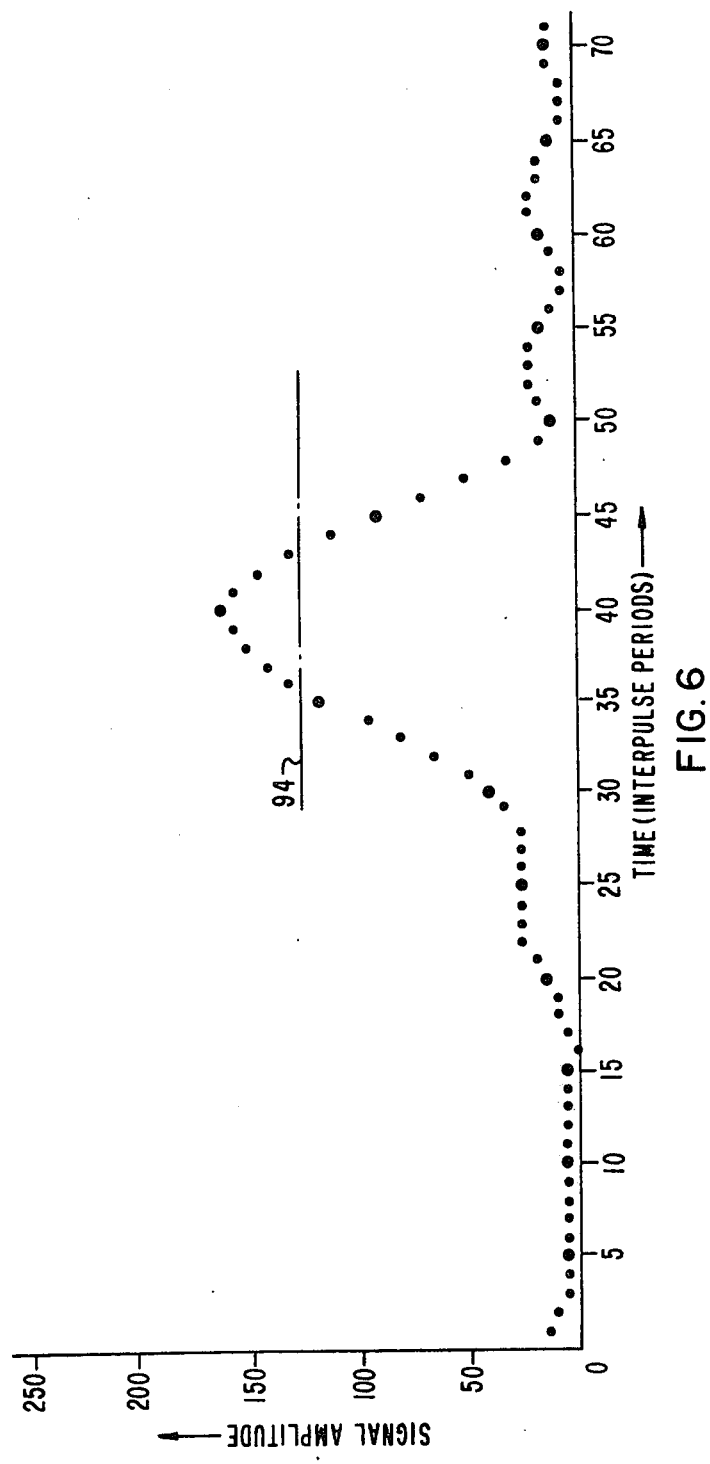

Assuming that the graphs of FIGS. 5 and 6 are representative of synchronized interpulse periods with the same initial time, the times at which the peak specular amplitudes are received may be compared. Suppose for example the amplitudes of FIG. 5 are representative of amplitude signals passing through the negative doppler processor 74 which may correspond to the blade velocities from the blade 66 (refer to FIG. 1). Then, if the CFAR threshold level is set at that denoted by the dotted line 92 in graph of FIG. 5 the amplitudes computed for pulse transmission times 24 through 30 may be passed by the detect circuit indicating the presence of a helicopter target. nhis information of course corresponds to the velocities of a rotating blade moving away from the radar set 10, the rotating blade being in a position approximately perpendicular to the radar transmissions. Suppose also, for example, that the amplitudes of the graph of FIG. 6 may be computed in the positive doppler processor 72 and are representative of the velocities of the blade 64. In addition, assume that the CFAR threshold has been set as denoted by the dotted line 94. Then, the reflected specular flash energy from the rotating blade perpendicularly positioned with respect to the radar transmissions may occur between pulse transmission 36 and pulse transmission 43. Accordingly, the amplitude levels of the graph of FIG. 5 from pulse transmission 24 through pulse transmission 30 inclusively, may be passed by the processor 74 to a delay line 90 and indicate the presence of a helicopter target. Likwise, the amplitude levels of the graph of FIG. 6 from 36 through 43, inclusively, may be passed by the processor 72 to the delay line 88 and are indicative of the same helicopter target 68. Note that since the two specular flashes occurred approximately concurrently (i.e. separated in time by merely 0.52 msec. as compared to 30 msec. for example), it may be concluded that the helicopter target 68 represented by the reflected signals of FIGS. 5 and 6 has an even number of rotating blades. Conversely, if the specular flashes were separated in time, say by 30 msec., for example, then it may be concluded that the helicopter target 68 contained an odd number of rotating blades.

A conditioning circuit 98 conditionally receives the specular flash pulses comprised of the passed amplitude signals from the processors 72 and 74 and logically determines that a target has been detected and provides a signal TD to an unambiguous range computer 100, which may be a minicomputer or microprocessor system, for example, additionally disposed within the helicopter detection system 50, the interconnections to the computer 100 being well known to anyone skilled in computer systems. The circuit 98 in addition determines logically whether the detected helicopter has an even number or an odd number of rotating blades. This indication is also provided to the unambiguous range computer 100 utilizing the signal FP which for the purposes of the present embodiment may indicate an even number of helicopter blades by a zero value and an odd number of helicopter blades by an absolute one value, for example. The combinational and sequential logic circuits of 98 are considered by themselves well known to anyone skilled in the pertinent art and the details of which are not considered part of the present invention.

In the course of operating the radar set 10, an impulse type radar interference signal transmitted by another transmitter possibly for jamming purposes, for example, may be picked up by the receiver 30 and may induce false detection of radar targets by the MTI 38. In the present embodiment described in connection with FIGS. 1-6, if the magnitude of the interference radar signal picked up by the radar receiver 30 is large enough, it may result in ringing the processors 72 and 74 and cause them to respond falsely with an indication of the presence of a helicopter target. To rectify this potentially undesirable condition in the present embodiment, a third processor 76 is included in the helicopter detection system 50 to detect doppler shift frequencies representative of the undesirably received interference radar signals. The processor 76 may include similar functional elements in a similar circuit arrangement as that described in connection with the processors 72 and 74 except that the band-pass filter included therein may have the characteristics of passing substantially only those doppler shift frequencies in bands beyond the range of the helicopter rotating blade velocities. For the purposes of the present embodiment, the pass-band filter of 76 may be characterized to pass substantially only signals in the velocity range of mock 1 to mock 2, for example. Consequently, in the case in which an impulse interference signal rings the processors 72 and 74, it will also cause the processor 76 to respond. However, for the case in which an actual helicopter is detected, processors 72 and 74 may respond, but processor 76 has the characteristics to not respond.

Additionally included in the system 50 may be a pulse expander 102 coupled at the output of processor 76. The output signal 104 of the pulse expander 102 is coupled to two blanking circuits 106 and 108 which are disposed in the signal flow path between circuits 88 and 98, and between circuits 90 and 98 respectively. The blanking circuits 106 and 108 may be essentially gating circuits operative to inhibit the passage of false detection signals from the delay lines 88 and 90, respectively, to the circuit 98, the signal governing the inhibiting operation being the inhibiting signal 104 generated by the pulse expander 102. The delays of 88 and 90 may be adjusted in relation to the pulse expansion width of the pulse expander 102 so that the pulse detection signal which may be generated by either one or both of the processors 72 and 74 may be centered within the inhibiting signal 104, for example, to insure practical cancellation thereof. Thus, this additional circuitry including the interference doppler processor 76, the pulse expander 102, the delays 88 and 90, and the blanking circuits 106 and 108 is intended for excluding substantially the possibility of a false detection as a result of spurious impulse type interference radar signals which are picked up by the pulse doppler radar set 10.

It is understood that the entire operation for detecting helicopter specular flashes may be accomplished without disturbing the normal mode of operation of the pulse doppler radar set 10. It is further understood that the probability of detection on any single scan of the radar scanning purview may be dependent on the mode in which the radar is working. In the present example, the radar normally scans past a given angular position in about 30 milliseconds, that is, with a beam width $\theta$ of approximately one degree. This is the approximate interval between the specular flashes for a five-bladed helicopter. If the radar set is in a scanning mode where the beam is held in a fixed elevation position at the altitude from which the helicopter returns come, then the probability of detection for each scan of the radar will be high. If, on the other hand, the radar is scanning in elevation, then the probability of the detection of a specular flash from a helicopter target will be reduced to about 40% of the aforementioned probability. While this may seem to be a low probability of detection it must be remembered that the helicopters are slow moving targets and that many opportunities may be available to detect these targets. Thus, the cumulative probability of detection of a specular flash from a helicopter target may be maintained at a high level. High speed helicopters are of no concern since they can be detected in the normal MTI processor of the pulse doppler radar set.

Since the helicopter blades relfect a relatively wide band of doppler shift frequencies representative of the breadth of tangential velocities thereof and since the blades are approximately rotating at the same speed, the normal processing principles utilized by a conventional MTI processor which functions by varying the PRF of the radar transmissions and segregating targets from the doppler shift frequencies of the received signals reflected from the targets into a plurality of narrow band filter banks or cells, are not applicable for the purposes of determining unambiguous range measurements for detected helicopter targets. Therefore, something in lieu of the variable interpulse period doppler filter banks must be realized to resolve the ambiguities in range due to the high PRF used by most pulse doppler airborne radar sets. In the present embodiment, the unambiguous range computer 100 may be programmed to perform the functions of resolving the ambiguous range measurements for each detected helicopter target.

As illustratively shown in FIGS. 1 and 2, the unambiguous range computer 100 coordinates its processing activities with the inertial navigation system 56, the radar controller 22, and the ambiguous range cell processor 24 all being conveniently disposed in the radar set 10. Thus, in order to resolve the ambiguities in the range measurement for a particular helicopter target, the range computer 100 may depart from the normal mode of operation of the radar set. One method of resolving the range ambiguities of a particular detected target may be as briefly described herebelow.

Assuming that a specular flash from a helicopter target is detected by one or both of the processors 72 and 74 at a position in a first radar scan, preferably characterized by the coordinates (Az, El) as illustratively depicted in FIG. 1, the unambiguous range computer 100 is alerted with signals TD and FP. Concurrently, the azimuth, elevation, and PRF readings may be identified over the signal lines provided from the radar controller 22. Thereafter, a set of ambiguous range measurements associated with the detected target may be determined from the information provided to the range computer 100 over signal lines 52 from the ambiguous range cell processor 24. In the next scan of the radar set past the identified scanning position of the helicopter target, or within a predetermined band of scanning position locations thereabout, the PRF of the radar transmitter may be adjusted to the same value which existed when the first detection was made in the first scan. In this predetermined band of locations, it is expected that a second specular flash from the same helicopter target will be detected by one or both of the processors 72 and 74 and the detected set of ambiguous ranges associated therewith will be approximately the same as that for the first detection. Using the fact that the helicopter's blades rotate at approximately a constant rmp, the computer 100 may determine from the times identified corresponding to the first two detected specular energy flashes when in time, in a third scan of the radar, to expect a third specular flash of reflected energy. In addition, from the change in range observed from the two sets of ambiguous ranges corresponding to the first two detected specular flashes, the computer 100 may also determine the estimated radial velocity of the particular target.

Moreover, the doppler characteristics of the odd or even number of blades of the particular detected target may be of further value in correlating the detected target in a third scan. That is, if the helicopter has an even number of blades the signal PF supplied from the conditioning circuit 98 will have a zero value, for example, and if the particular detected helicopter has an odd number of blades, then the signal PF provided to the computer 100 may have an absolute value of one, for example.

Based on the information received and derived from the detection of the same target in the first and second scans of the radar set, the computer 100 may determine a predetermined time band in which a specular flash return from the same target may occur in the third scan with a different PRF of the radar, for example. In the third scan of the radar past the target, the PRF may be changed for the purposes of resolving the ambiguity in range thereof. Matching the third specular flash of the same target with the first two specular flashes in the two previous radar scans may be accomplished by observing a specular flash within the predetermined time band and correlating the amplitude and doppler characteristics of this third specular flash with the first two. The correct position of the target in the scan may be calculated from the sets of ambiguous ranges from all three observations, once correlation is identified.

Figure 7C:
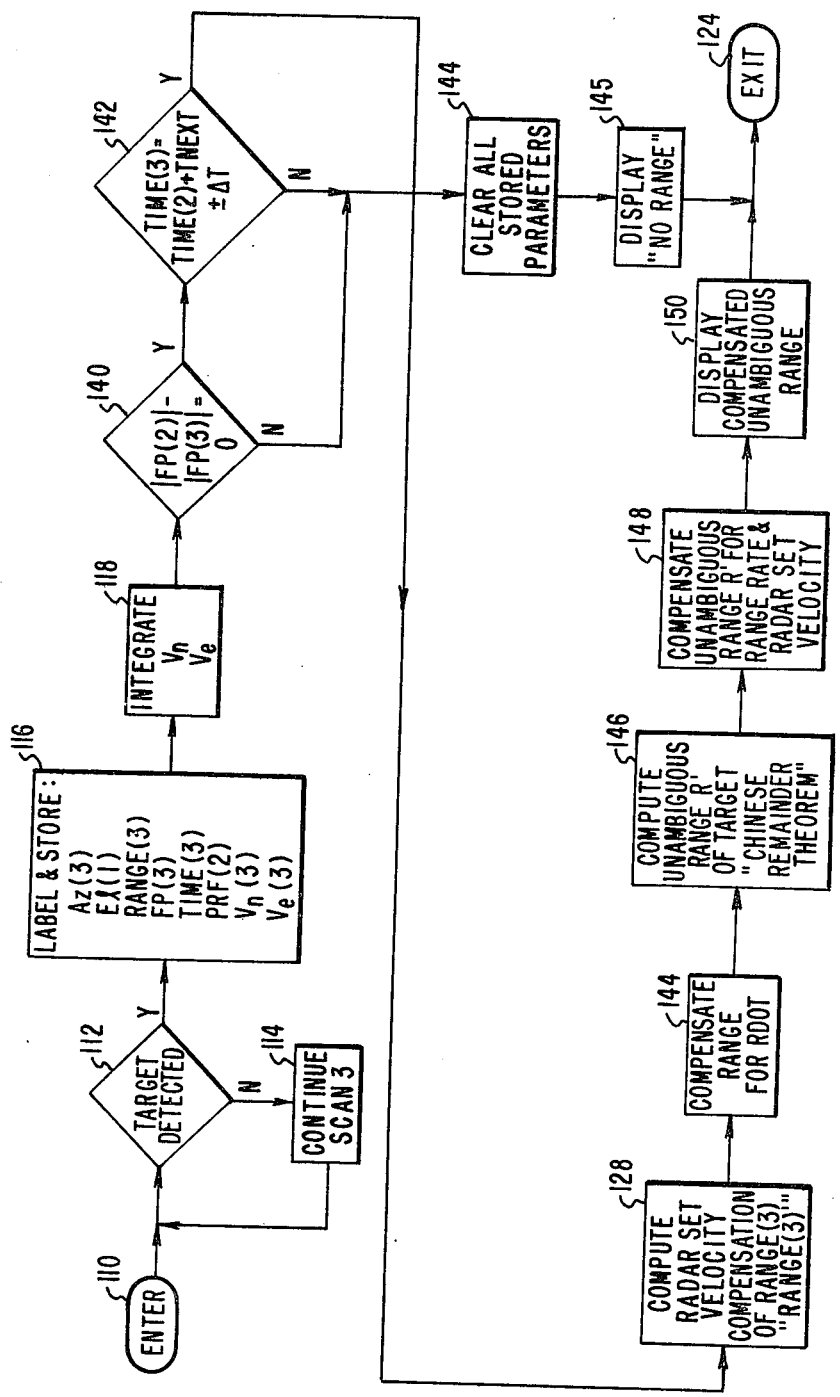

In more specific detail, the unambiguous range computer 100 may be programmed to accomplish the functions of this first method in accordance with the flow charts of FIGS. 7A, 7B and 7C. It is understood that the programming of a general purpose minicomputer or microprocessor in accordance with the functional flow charts of FIGS. 7A, 7B and 7C may be accomplished by any skilled computer programmer knowledgeable in such computer systems.

FIG. 7A exemplifies a functional flow chart for programming the computer 100 during a first scan in which the helicopter target is first detected. Generally, in these computer programs, some means is provided for entering the functional program either by periodic execution or on demand by an interrupt, for example. This is accomplished by the instructions denoted by block 110. Incrementally, during the first scan the signal TD is queried by the instructions of block 112 to determine if a target helicopter has been detected. If no target is detected, the scan is continued at block 114 until the next execution of decisional block 112. If a helicopter target is detected, the instructions of block 116 may be subsequently executed.

In the instructional block 116, the azimuth, elevation and PRF readings denoted as Az(1), El(1) and PRF(1) corresponding to the detected target in the first seam may be identified from the signals provided to the computer 100 from the radar controller 22 and stored in appropriate locations in the memory of the computer 100. Concurrently, the time of target detection, denoted as TIME (1) provided to the computer from the inertial navigation system, for example, is also identified and stored in an appropriate register in memory. In addition, the logical parameter FP(1) corresponding to the blade characteristics of the detected target is also identified and stored accordingly. From the signals 52 provided to the computer 100 from the ambiguous range cell processor 24, the computer 100 determines a set of ambiguous ranges, denoted as RANGE (1), corresponding to the detected target using well-known techniques similarly used by the MTI 38. The memory bookkeeping chores associated with these identified and determined parameters may be taken care of by any person skilled in the art of programming and is of little consequence to the present invention. In the next instructional block 118, the computer 100 is instructed to integrate the north velocity vector $V_n$ and the east velocity vector $V_e$ for the purposes of deriving positional movement in the airborne radar set between scans. This will be more fully understood from the description here to follow. In the next instructional block 120, the radar controller 22 is commanded using the commands over signal lines 54 to set the PRF of the radar transmitter to the value denoted as PRF(1) at the scanning locations in the second scan characterized by the elevation value El(1) and azimuth readings of $\pm\theta/2$ about the azimuth reading Az(1). The functional flow chart for scan 1 is then exited at block 124.

The functional flow chart of scan 2 for programming purposes is shown in FIG. 7B. It is assumed and is considered preferable that these scans all originate from the same initial scanning point. Execution then of the scan 2 functional flow chart similarly begins at the entry point 110. Likewise, the loop including decisional block 112 and instructional block 114 is executed periodically to determine the detection of a target. For the purposes of the present example, the flow chart of scan 2 is only interested in a target being detected in the band of scanning locations designated by El(1) and Az(1) $\pm\theta/2$. Accordingly, if a target is detected in this band of scanning locations, instructional block 116 is next executed. In 116, a second azimuth reading denoted as Az(2) is identified and stored. It is understood that the elevation and PRF values were commanded to remain the same in this band of scanning locations. The second detection time denoted as TIME (2) and signal value FP denoted as FP(2) are identified and additionally stored. Another set of ambiguous ranges are determined denoted as RANGE (2) and likewise stored in appropriate memory locations. And also in block 116, the positional movements of the air-borne radar set in the northern and eastern directions denoted by $V_n(1)$ and $V_e(1)$, respectively, resulting from the previous integration between the TIME (1) and TIME (2) are determined and stored accordingly.

Thereafter, the velocity vectors $V_n$ and $V_e$ are again integrated with the execution of block 118. Next, in instructional block 128, the set of ambiguous ranges denoted by RANGE (2) are compensated for the movement of the airborne radar set between TIME (1) and TIME (2) to yield a new set of ambiguous ranges denoted as RANGE (2)'. In the computations of block 128, the sine and cosine trigonometric identities, the angular azimuth reading Az(2), and the values of the movement of the aircraft in the northern and eastern directions between times (1) and (2), that is $V_n(1)$ and $V_e(1)$, are used. In the succeeding instructional block 130, the rate of change of the range of the helicopter target denoted as RDOT may be computed as a function of the compensated set of ambiguous range measurements RANGE (2)' and the set of ambiguous range measurements denoted as RANGE (1). Continuing, the next target detection time for the same target in a third scan is computed by block 132 utilizing the detection times TIME (1) and TIME (2) already identified. All of the previously computed new parameter values are appropriately stored in the computer memory in accordance with instructional block 134. Thereafter, the radar controller 22 is commanded through signal lines 54 to set its PRF equal to a new PRF value of PRF(2) in the third scan within a band of scanning locations designated by the computed next target detection time which may be around the locations El(1), Az(2) $\pm \theta/2$ by the instructions of block 136. The flow chart is again exited at point 124.

The flow chart for scan 3 preferably used for programming purposes for the present example is shown in FIG. 7C. Again, it is assumed that the radar scanning is initiated at the same initial scanning point as the previous two scans. Entry block 110, decisional block 112 and instructional block 114 are again executed in the same manner as the previous two functional flow charts. Just as explained before, the primary interest of the present example is in the detection of the same target which may fall approximately within the band of scanning locations denoted by El(1) for Az(2) $\pm \theta/2$. Should a target be detected in close proximity to this band of scanning locations instructional block 116 may be executed. As a result of the execution of block 116, the scanning location corresponding to the detected target denoted as Az(3) and El(1) is identified and stored in memory. Likewise, the third detection time denoted as TIME (3) and the PRF value used in the detection of the target denoted as PRF (2) are identified and stored in memory along with the value of the signal FP denoted as FP(3). A third set of ambiguous ranges associated with the third detected target and denoted as RANGE (3) are perfectly stored in memory. In addition, the positional movement of the airborne radar set between TIME (1) and TIME (3), being $V_n(3)$ and $V_e(3)$, as a result of the integration of the velocities $V_n$ and $V_e$, respectively, are stored in prespecified memory locations. Having performed these bookkeeping chores, the computer 100 next executes the instructional block 118.

Subsequently, decisional blocks 140 and 142 may be executed to correlate the information identified for the detected targets in scans 2 and 3. More specifically, in decisional block 140, it is determined if the signals FP(2) and FP(3) are equivalent which is an indication that the detected targets associated therewith have the same blade characteristics, that is, either an odd number of blades or an even number of blades. In the decisional block 142, it is determined if the identified time corresponding to the target detected in the third scan denoted as TIME (3) is equivalent to the predicted time previously computed denoted as TIME (2) and TNEXT within a given margin of uncertainty or error $\pm \Delta T$. If either of the decisions of blocks 140 and 142 respond negatively indicating that a correlation does not exist, all of the memory registers associated with the computed and identified parameters of the detected targets in the three scans are cleared with the instructional block 144 and subsequently instructional block 145 may display on the display 44 the indication "no range" and the flow chart may be exited at point 124. If, on the other hand, a correlation in the targets does exist as provided by a positive response by the decisional blocks 140 and 142 the instructional block 128 may be again executed to compensate the set of ambiguous range measurements denoted as RANGE (3) for the positional movement of the airborne radar set between the times denoted as TIME (1) and TIME (3). Here again, the trigonometric identities of sine and cosine utilizing the azimuth angle Az(3) and the computed positional changes in the north and east directions denoted as $V_n(3)$ and $V_e(3)$ are used in any number of well-known equations to yield a new set of ambiguous range measurements denoted as RANGE (3)'. In the succeeding instructional block 144, the compensated set of ambiguous range measurements RANGE (3)' may be compensated for the previously computed rate of change of range RDOT of the detected helicopter target. This compensation computation yields another set of ambiguous ranges denoted as RANGE (3)". Thereafter, in an instructional block 146, the unambiguous range of the detected target may be computed as a function of the values of the pulse repetition frequencies PRF(1) and PRF(2) and the compensated sets of ambiguous range measurements RANGE (2)' and RANGE (3)" using well-known MTI techniques like the "Chinese Remainder Theorem", for example. The unambiguous range denoted as R' determined from block 146 may be compensated for the helicopter target and airborne radar set movements between TIME (1) and TIME(3). This occurs in the instructional block 148. Finally, the computed unambiguous range denoted as R is displayed on the display 44 in accordance with the instructions executed in block 150. Thereafter, the program flow chart is exited at point 124. Note that the azimuth angle Az(3) along with the helicopter symbol may also be displayed on the display 44 with the instructions of block 150.

To further clarify the measurements used in the method of computing unambiguous range, the following glossary of terms is provided:

Az is azimuth angle of radar beam reference to north.

El is elevation angle of radar beam reference to horizon.

Range (I) is range gate measurements of height scan detection of scan I.

Time is time of specular flash in milliseconds.

PRF(I) is pulse repetition frequency (I). Several PRF's are available with prime ratios to allow use of Chinese remainder theorem.

$V_n$ is north-south component of radar set velocity.
$V_e$ is east-west component of radar set velocity.
$\theta$ is beam width of radar transmission.
$\Delta T$ is time correlation window uncertainty.

In an alternate embodiment for resolving the ambiguities in range of a detected helicopter target, sometimes referred to as the back-scan ranging mode, the computer 100 shown schematically in FIG. 2 may command the radar controller 22 of FIG. 1 over signal lines 54 to alter its transmission (carrier) frequency FREQ such that the beam of the radar transmission may be scanned backwards one beam width at a scan location corresponding to a detected helicopter target. This mode may be generally activated after detecting a helicopter target in a previous radar scan. The information that is generated when the back scan mode is activated is similar to that of the second scan in the embodiment described in connection with the charts of FIGS. 7A through 7C and which may be referred to as the sequential scan technique. This alternate back scan method of resolving the range ambiguity may be accomplished by using the fact that the antenna transmission beam may back scan in azimuth if the electronic transmit frequency is changed. Thus, by electronic frequency scanning the beam in the opposite direction to a mechanical antenna rotation, the beam may be scanned expeditiously over a band of azimuth positions a number of times in a short period of time. Under these circumstances, it may be possible for the helicopter detection system 50 to acquire an adequate number of specular flashes from the detected helicopter target. In other words, this process of resolving the range ambiguity may be the same as that described for the sequential scan technique except that it may be accomplished in a relatively short time period.

Typically, after the radar scan is virtually held stationary by scanning back one beam width, and after the second scan type information is collected, the computer 100 may then command the radar controller 22 to change the PRF of the radar transmitter 26 and to again change the scan frequency FREQ to once more back scan the radar transmission beam one beam width, for example, to collect the information associated with the helicopter target that is gained on the third scan of the sequential technique described hereinabove. A primary advantage of the back-scan technique may be that the helicopter blade rotation is not expected to vary substantially in the time difference between measurements only a very small fraction of an rpm, for example, rendering a more precise time correlation for resolving range ambiguities. In addition, the helicopters and the radar set are not expected to incur significant motion in the time difference between measured flashes. Consequently, correlation is very positive since the target may remain substantially in the same range cells of the helicopter detection system. Thus, this second technique is suitable for relatively large numbers of targets within one azimuth beam width.

In more specific detail, the alternate embodiment utilizing a back scanning mode of the radar controller 22 to resolve range ambiguities in detected helicopter targets, may be described in connection with FIGS. 1 and 2 and a set of functional flow charts shown in FIGS. 8A, 8B and 8C which are suitable for describing the programmed operations of the unambiguous range computer 100.

Referring to FIG. 8A, the program associated with detecting a helicopter target and identifying the parameters associated therewith in connection with an initial scan of the radar set 10 has as a program entry point block 160. The decisional blocks 161 and instructional block 162 form a continuous loop which are iteratively executed until a target is detected. Upon detection of a target, the instructional block 164 is next executed wherein the azimuth, elevation, FP, time, and PRF readings associated with the detected target and denoted by a (1) are identified by the range computer 100 and stored in selectively chosen memory registers. In addition, a set of ambiguous range measurements are determined from the information signals 52 provided to the range computer 100 from the ambiguous range cell processor 24 also denoted by a (1). Thereafter, in block 166 a second electronic scanning frequency FREQ (2) is determined, preferably using a look-up table of stored values associated therewith. Execution of block 168 instructs the computer 100 to output commands to the radar controller 22 over signal lines 54 to set the scanning frequency to FREQ (2) and the PRF to the value PRF (1) at the elevation El (1). The program is then exited at point 170.

It is understood that with the execution of the instructions of block 168, the radar set 10 is commanded to scan past the identified scanning locations Az(1), and El(1) for a second time which will be referred to as dwell TIME (1). Instructions 160, 161 and 162 will be executed for the dwell TIME (1) at the electronic transmission frequency FREQ (2) until a target, that is the same target, is again detected whereafter instructional block 164 is executed again. In 164, a second set of scanning coordinate locations are identified as [Az(2), El(1)] for the second detection of the target. In addition, the time of detection TIME (2), FP(2), and PRF(1) are additionally determined therewith. Similarly, a second set of ambiguous range measurements are determined for the second detection from the information provided over signal line 52 to the computer 100. The next sequence of decisional instructional blocks 172 and 174 are executed successively under the conditions of a positive target correlation, that is, the first and second targets are determined to be the same.

For example, in decisional block 172, it is determined if both the first and second detected targets have an even number of blades or an odd number of blades using the characteristic code FP. If so, it is next determined in decisional block 174 if the sets of ambiguous range measurements determined for the first and second detected targets are equivalent substantially. If either of the decisional blocks 172 or 174 provide a negative correlation result, blocks 178 and 179 are thereafter successively executed to clear all of the information stored in the appropriate memory locations and to display no range on the display unit 44. After execution of 179 the program is exited at 170.

Should both of the decisional blocks 172 and 174 render a positive correlation, the time between the target detections is computed in block 180 which may be used to predict the next target detection in a successive dwell time. In a subsequent instructional block 182, another transmission frequency FREQ (3) may be determined from a conventional look-up table, for example. And thereafter, the instructions of block 184 may cause commands to be output from the computer 100 over signal lines 54 to the radar controller 22 to set the transmission frequency to FREQ (3) and to set the PRF at the value PRF (1) at the elevation El (1). Thereafter, the program is exited at point 170.

Figure 8C:
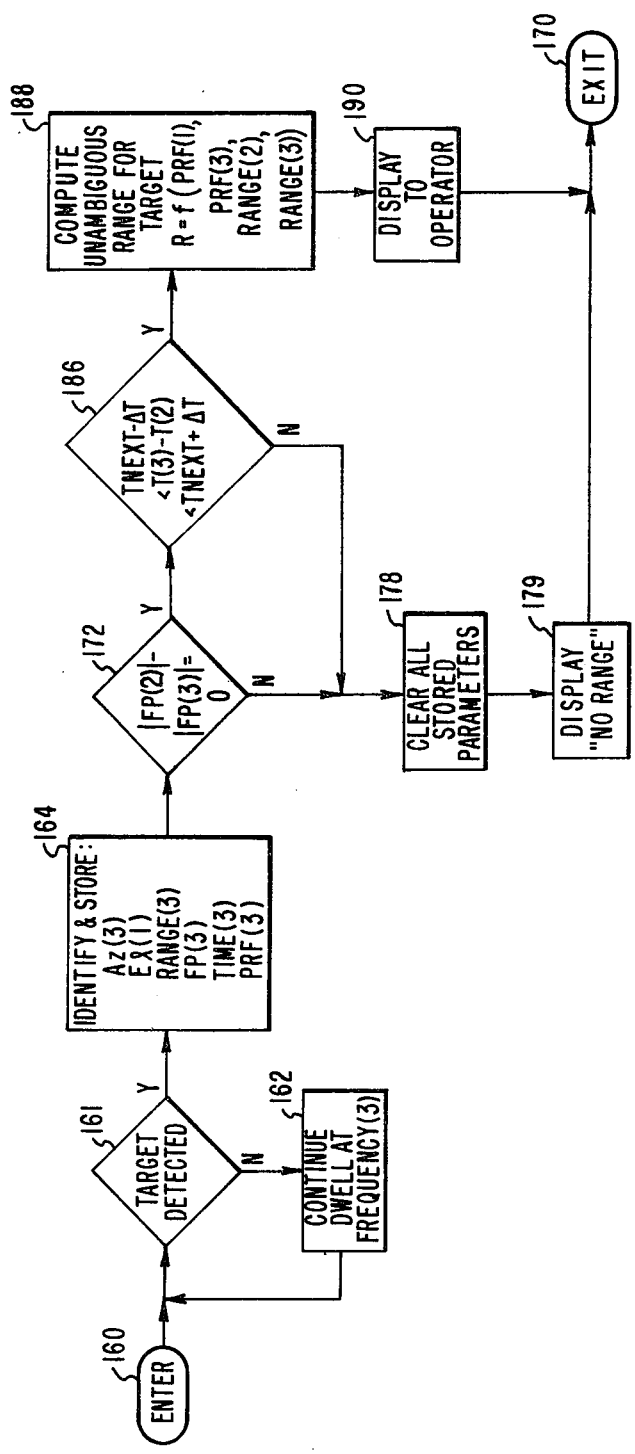

Referring to FIG. 8C, the functional flow chart suitable for describing the operation associated with the dwell time (2) is initiated with the entry statement 160. The instructions 161 and 162 are iteratively executed until a target is detected within the dwell (2) at the transmission frequency FREQ (3). Then, the instructional block 164 is executed for the third time wherein the scanning locations Az(3), El(1) are identified along with the additional parameters FP (3), TIME (3), and PRF (3). All identified parameters of block 164 are appropriately stored in selectively chosen memory locations. A third set of ambiguous range measurements denoted as RANGE (3) are determined for the detected target in the dwell (2) in the same manner as before. Another pair of decisional blocks denoted as 172 and 186 may be successively executed for correlation of the targets detected in the dwell (1) and dwell (2) time periods.

More specifically, the decisional block 172 determines if both the detected targets in dwell (1) and dwell (2) have an even number of blades or an odd number of blades. Decisional block 186 is used in place of decisional block 174 (see FIG. 8B) to correlate targets with respect to detection time rather than sets of ambiguous ranges as a result of the changing of the pulse repetition frequency in the second dwell time. In 186, it is determined if the difference in detection times (2) and (3) are within the limits of uncertainty $\pm \Delta T$ about a predicted difference in time TNEXT computed in instructional block 180 of FIG. 8B. If either of the decisional blocks 172 and 186 render a negative indication of correlation, the instructional blocks 178 and 179 are again successively executed and the program is exited at point 170. Otherwise, the unambiguous range measurement for the detected target is computed using the identified sets of ambiguous range measurements denoted as RANGE (2) and RANGE (3) together with the PRF (1) and PRF (3), respectively associated therewith. Techniques, like the Chinese Remainder Theorem, which are well known may be used for these purposes. Once this computation is made, the results and any additional information in connection therewith may be displayed to the display unit 44 with the instructions of block 190. Thereafter, the program is executed at point 170.

A third alternate embodiment for resolving range ambiguities associated with a detected helicopter target may be that of a slow scan ranging technique. If the mechanical scanning of the radar transmission is decreased by at least a factor of 3, adequate time may be available to form the resolution of ambiguous range connected with the same detected helicopter target in a fashion similar to the back-scanning technique described supra. The functional flow charts in FIGS. 8A, 8B and 8C may be used again to program the operation of the computer 100 and its cooperation with the other peripheral processing units 56, 22 and 24, for example.

It is understood that while the aspects of applicant's invention have been described in connection with the embodiment shown in FIGS. 1 and 2, other modifications and additions may be made to this embodiment without deviating from the present invention. Therefore, applicant's invention should not be limited to any one embodiment, but rather construed by the breadth and broad scope of the claim recitation heretofollow.

I claim:

1. In an airborne pulse doppler radar set having a transmitting unit for transmitting radar energy pulses within a scanning purview; a receiving unit for receiving transmitted radar signals which are reflected from objects within said radar scanning purview, said received reflected radar signals including the doppler shift frequency signals of the corresponding reflective objects; and a first processor for processing said doppler shift frequency signals to detect moving objects in the scanning purview of the radar set, said first processor including a first filtering means for rejecting substantially doppler shift frequency signals which fall within predetermined frequency bands so as to avoid the processing thereof by said first processor, the improvement comprising a second processor operative to detect helicopters which have reflected doppler shift frequency signals, representative of the velocity of the helicopter body, that fall within said rejection frequency bands of said first filtering means, said helicopters being of the type having at least one rotor blade rotating within a predetermined velocity band, said second processor comprising:

a second filtering means coupled to said receiving unit and operative to pass substantially that portion of the received reflected radar signals having doppler shift frequencies which are representative of the velocity of said at least one rotating blade of at least one helicopter;

means for deriving a threshold value based on the signal values passed by said second filtering means; and means for generating detection signals corresponding to the signals passed by said second filtering means which have values of at least that of said derived threshold value, said detection signals being representative of the presence of at least one helicopter in the scanning purview of said radar set.

2. The pulse doppler radar set in accordance with claim 1 wherein the receiving unit is additionally operative to receive interference radar signals which are, at times, capable of causing the second processor to falsely detect the presence of a helicopter; and wherein the second processor includes another processing means operative to detect the doppler shift frequency signals representative of received interference radar signals, said another processing means being operative to generate a signal at times corresponding to said detected radar interference to inhibit the generation of the detection signals of the second processor.

3. The pulse doppler radar set in accordance with claim 2 wherein the another processing means comprises:

a third filtering means coupled to said receiving unit and operative to pass substantially that portion of the received radar signals which have doppler shift frequencies representative of the interference radar signals;

means for deriving a second threshold value based on the signal values passed by said third filtering means; and means for generating an inhibiting signal corresponding to the signals passed by said third filtering means which have values of at least that of said derived second threshold value.

4. The pulse doppler radar set in accordance with claim 1 wherein the second processor further includes means operative to compute the unambiguous range of each detected helicopter in the scanning purview of the radar set.

5. The pulse doppler radar set in accordance with claim 1 wherein the second processor further includes means for distinguishing between a detected helicopter having an even number of rotating blades and a detected helicopter having an odd number of rotating blades.

6. A helicopter detection system for the radar detection of helicopters having at least one rotor blade rotating within a predetermined velocity band, said system including: a radar transmitting unit for transmitting radar energy pulses at at least one predetermined pulse repetition frequency within a scanning purview; a radar receiving unit for receiving transmitted radar signals which are reflected from objects within said radar transmission scanning purview, said received reflected radar signals including the doppler shift frequency signals of the corresponding reflective objects; a radar clutter filtering means coupled to said receiving unit, for rejecting substantially doppler shift frequency signals of the received signals which fall within predetermined frequency bands so as to prevent further processing of said rejected signals, the reflected doppler shift frequency signals which are representative of the body velocity of said helicopter being within at least one of said predetermined doppler shift frequency bands;

a first doppler processor operative to detect the doppler shift frequency signals representative of a helicopter blade rotating in a first direction with respect to said radar transmission at a velocity in said predetermined velocity band and to provide a first signal indicative of said detection;

a second doppler processor operative to detect the doppler shift frequency signals representative of a helicopter blade rotating in a second direction with respect to said radar transmitter at a velocity in said predetermined velocity band and to provide a second signal indicative of said detection; and means responsive to said first and second signals to generate a third signal indicative of the presence of at least one helicopter in the scanning purview of said radar transmitter.

7. A helicopter detection system in accordance with claim 6 wherein the generating means includes means operative to generate a fourth signal indicative of the at least one detected helicopter having an odd number of blades and a fifth signal indicative of the at least one detected helicopter having on even number of blades.

8. A helicopter detection system in accordance with claim 7 wherein the generating means includes means for generating the fourth signal corresponding to the presence of at least one of the first and second signals within a first given time interval and means for generating the fifth signal corresponding to the presence of both of the first and second signals within a second given time interval.

9. A helicopter detection system in accordance with claim 6 further including a third doppler processor operative to detect the doppler shift frequency signals representative of interference radar signals and to generate an inhibiting signal, indicative of said detection, which is provided to the generating means to inhibit the generation of at least the third signal.

10. A helicopter detection system in accordance with claim 9 wherein the third doppler processor comprises:

a band-pass filter for passing substantially the doppler shift frequency signals selected as representative of interference radar signals;

means for computing the amplitudes of the signals passed by said band-pass filter;

means for deriving a threshold value based on said computed amplitude values; and means for generating the inhibiting signal corresponding to the times when said computed amplitude value is at least that of said derived threshold value.

11. A helicopter detection system in accordance with claim 6 wherein the first doppler processor comprises:

a first band-pass filter for passing substantially the doppler shift frequency signals representative of a helicopter blade rotating in the first direction at a velocity within the predetermined velocity range;

means for computing the amplitudes of the signals passed by said first band-pass filter, said computed amplitudes referred to as first amplitudes;

means for deriving a threshold value based on the values of said first amplitudes;

means for generating the first signal corresponding to the times when a value of said first amplitudes is at least that of the derived threshold value.

12. A helicopter detection system in accordance with claim 11 wherein the first band-pass filter passes substantially the doppler shift frequency signals representation of a helicopter blade having at least one positive rotational vector component pointing radially away from the radar transmission; and wherein the computing means includes means for computing the first amplitude values which are correspondingly commensurate with the values of said positive rotational vector component pointing radially away from the radar transmission.

13. A helicopter detection system in accordance with claim 6 wherein the second doppler processor comprises:

a second band-pass filter for passing substantially the doppler shift frequency signals representative of a helicopter blade rotating in the second direction at a velocity within the predetermined velocity range;

means for computing the amplitudes of the signals passed by said second band-pass filter, said computed amplitudes referred to as second amplitudes;

means for deriving a threshold value based on the values of said second amplitudes; and means for generating the second signal corresponding to the times when a value of said second amplitudes is at least that of the derived threshold value.

14. A helicopter detection system in accordance with claim 13 wherein the second band-pass filter passes substantially the doppler shift frequency signals representative of a helicopter blade having at least one positive rotational vector component pointing radially toward the radar transmission; and wherein the computing means includes means for computing the second amplitude values which are correspondingly commensurate with the values of said positive rotational vector component pointing radially toward the radar transmission.

15. A helicopter detection system in accordance with claim 6 including another processor governed by at least the third signal to compute the unambiguous range of a detected helicopter in accordance with a function based on the azimuth, elevation, PRF and real time clock parameter values associated with the detected helicopter.

16. A helicopter detection system in accordance with claim 15 wherein the another processor includes means for computing the unambiguous range of the detected helicopter also as a function of the ambiguous ranges compensated for any positional variation of the radar transmitter and receiver with respect to the detected helicopter during said computations.

17. A method of computing the unambiguous range of a target detected with a pulse doppler radar set comprising the steps of:
   (a) detecting a target at a first detection location and first detection time in a first scan of said radar set with a first PRF value;
   (b) governing the pulse doppler radar set to detect said target in a second scan by setting the PRF of the radar set at said first PRF value within a predetermined band of locations about said first detection location;
   (c) identifying a second detection location and second detection time associated with target detection within said predetermined band of locations in said second scan;
   (d) determining a first set of ambiguous range measurements associated with said target detection at said second location in said second scan with said first PRF value;
   (e) calculating a next detection time from the values of said first and second detection times;
   (f) governing the pulse doppler radar set to detect a target in a third scan by setting the PRF of the radar set to a second PRF value at a time corresponding to said calculated next detection time;
   (g) identifying a third detection location and third detection time associated with the detection of a same target at a time corresponding to said calculated next detection time in said third scan;
   (h) determining a second set of ambiguous range measurements associated with said same target detection at said third location in said third scan with said second PRF value; and
   (i) computing an unambiguous range measurement of said same target in accordance with a function based on said determined first and second sets of ambiguous range measurements and said first and second PRF values respectively associated therewith.

18. The method in accordance with claim 17 including the steps of compensating the first and second sets of ambiguous range measurements for any movement in the pulse doppler radar set between the first and second detection times and between the first and third detection times, respectively; and wherein the unambiguous range measurement of the same target is computed using the compensated first and second sets of ambiguous range measurements.

19. The method in accordance with claim 17 including the steps of:
   determining an initial set of ambiguous range measurements associated with the detection of the target at the first detection location in the first scan with the first PRF value;
   calculating a rate of change in range of the detected target as a function of the initial and first sets of ambiguous range measurement; and
   compensating the second set of ambiguous range measurements in accordance with said calculated rate of change of the detected target; and wherein
   the unambiguous range measurement of the same target is computed using the compensated second set of ambiguous range measurements.

20. The method in accordance with claim 17 wherein step (g) includes the step of correlating the calculated next and identified third detection times to determine if the detected target in the third scan is the same target as that detected in the first and second scans.

21. The method in accordance with claim 20 wherein the targets are helicopters; and further including the steps of:
   identifying a characteristic relating to the number of rotating blades of each of the detected helicopter targets; and
   correlating the identified characteristics of said detected targets to further determine if the targets detected in the first, second and third scans are the same target.

22. The method in accordance with claim 21 wherein the helicopter characteristic is identified from the even and odd number of rotating blades thereof.

23. The method in accordance with claim 19 wherein:
   the target is detected at a first detection location in the first radar scan characterized by a first azimuth and first elevation coordinate values;
   the pulse doppler radar set is governed to detect the target in the second radar scan within a first predetermined band of scan locations characterized by said first elevation coordinate reading and a predetermined azimuth band about said first azimuth coordinate reading;
   the target is identified at a second detection location characterized by said first elevation and a second azimuth coordinate reading;
   the pulse doppler radar set is governed to detect the target in the third radar scan at a time corresponding to the calculated next detection time; and
   the target is identified at a third detection location characterized by a first elevation and third azimuth coordinate reading.

* * * * *